United States Patent [19]

Bai et al.

[11] Patent Number: 5,125,297
[45] Date of Patent: Jun. 30, 1992

[54] WHEEL NUT LOOSENING AND TIGHTENING HAND TOOL

[76] Inventors: Dawn Bai, No. 6, Dzon-Yong Rd.; Claude Huang, No. 57, Sec. 1, Sen-Lin Rd., both of Taichung, Taiwan

[21] Appl. No.: 741,903

[22] Filed: Aug. 8, 1991

[51] Int. Cl.⁵ .............................................. B25B 17/00
[52] U.S. Cl. ..................... 81/57.31; 81/57.3
[58] Field of Search ................... 81/57.31, 57.3, 57.14; 475/270, 317, 349

[56] References Cited

U.S. PATENT DOCUMENTS 3,992,964 11/1976 Osmond ............................. 81/57.31

Primary Examiner—D. S. Meislin
Attorney, Agent, or Firm—Browdy and Neimark

[57] ABSTRACT

A hand tool for use in loosening and tightening the wheel nut comprises a main body, a first cover body, a first shaft bearing, a second cover body, a second shaft bearing, a first drive member, a second drive member, a transmission, and a positioning means. The first cover body and the second cover body serve to accommodate therein respectively a shaft bearing to support the first drive member and the second drive member so as to provide the hand tool with a speeding and torguing advantage. The positioning means consists of a set rod and a support rod, thereby providing the hand tool with to actuate the main body and the second drive member in order to overcome the situation in which a high speeding motion and a low torguing motion take place.

1 Claim, 4 Drawing Sheets

WHEEL NUT LOOSENING AND TIGHTENING HAND TOOL

BACKGROUND OF THE INVENTION

1. Field of the Invention

The present invention relates to a hand tool, and more particularly to a hand tool designed for use in loosening and tightening the wheel nuts.

2. Prior Art

The hand tool intended for use in loosening the nuts fastened securly and tightly to the wheels of automobiles has been developed, as exemplified in the U.S. Pat. No. 3,992,964 in which Osmond discloses a hand tool capable of loosening the wheel nuts of automobiles by means of a coordinated effort of a gear assembly and a bracing rod, which make up the same. The hand tool proposed by Osmond is however defective in that its structural layout as a whole is not well designed, resulting in an unreliable and unstable work performance of the same.

SUMMARY OF THE INVENTION

It is therefore the primary object of the present invention to provide a wheel nut loosening and tightening hand tool with a perfect and precise structural layout enabling the hand tool user to perform the task with ease, speed, and stability.

This and other objects will become apparent from a careful reading of the description provided hereinafter, with appropriate reference to the attached drawings, in which:

DETAILED DESCRIPTION OF THE PREFERRED EMBODIMENT

Figure 1:
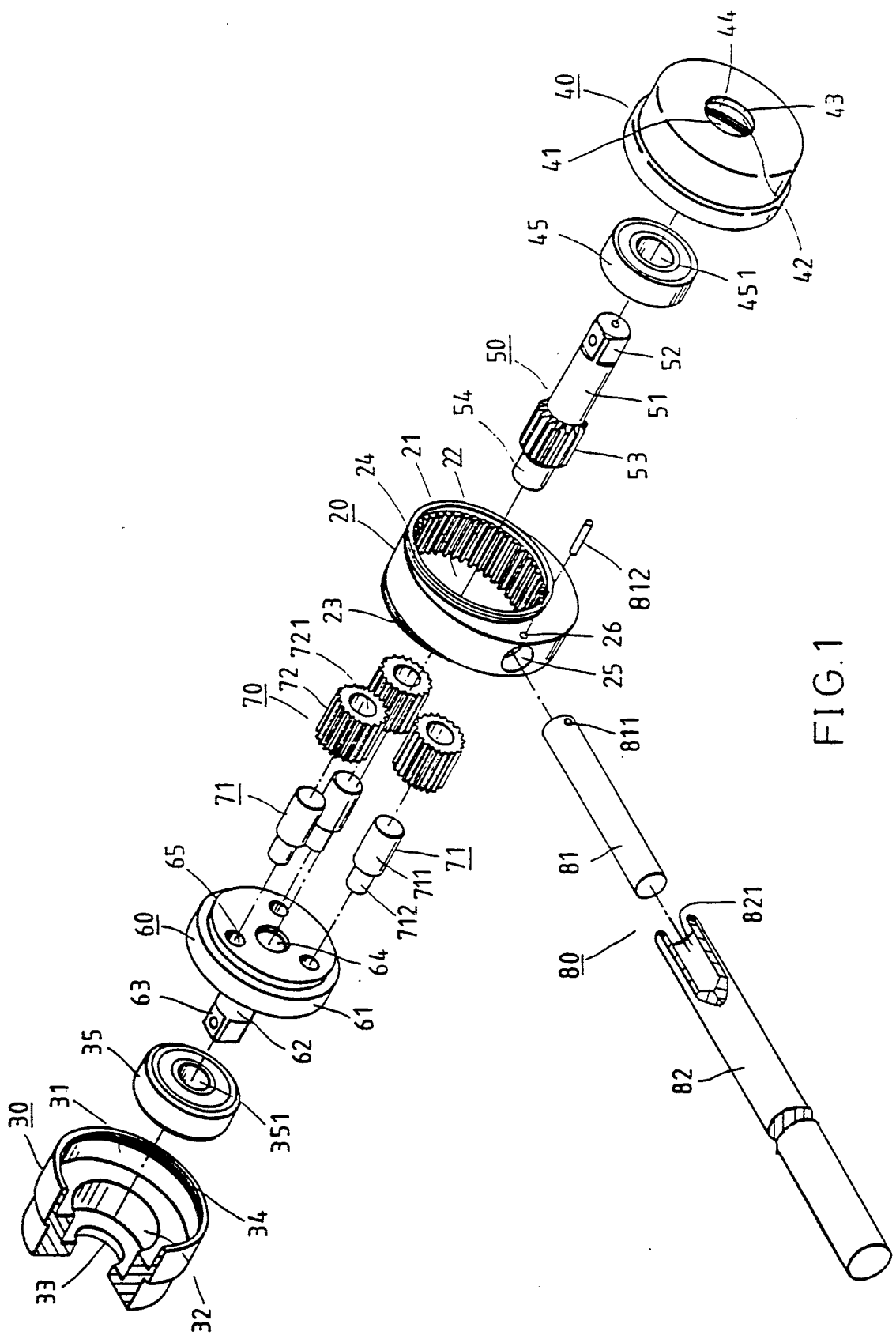
FIG. 1 is an exploded view of the hand tool in accordance with the present invention.
Figure 2:
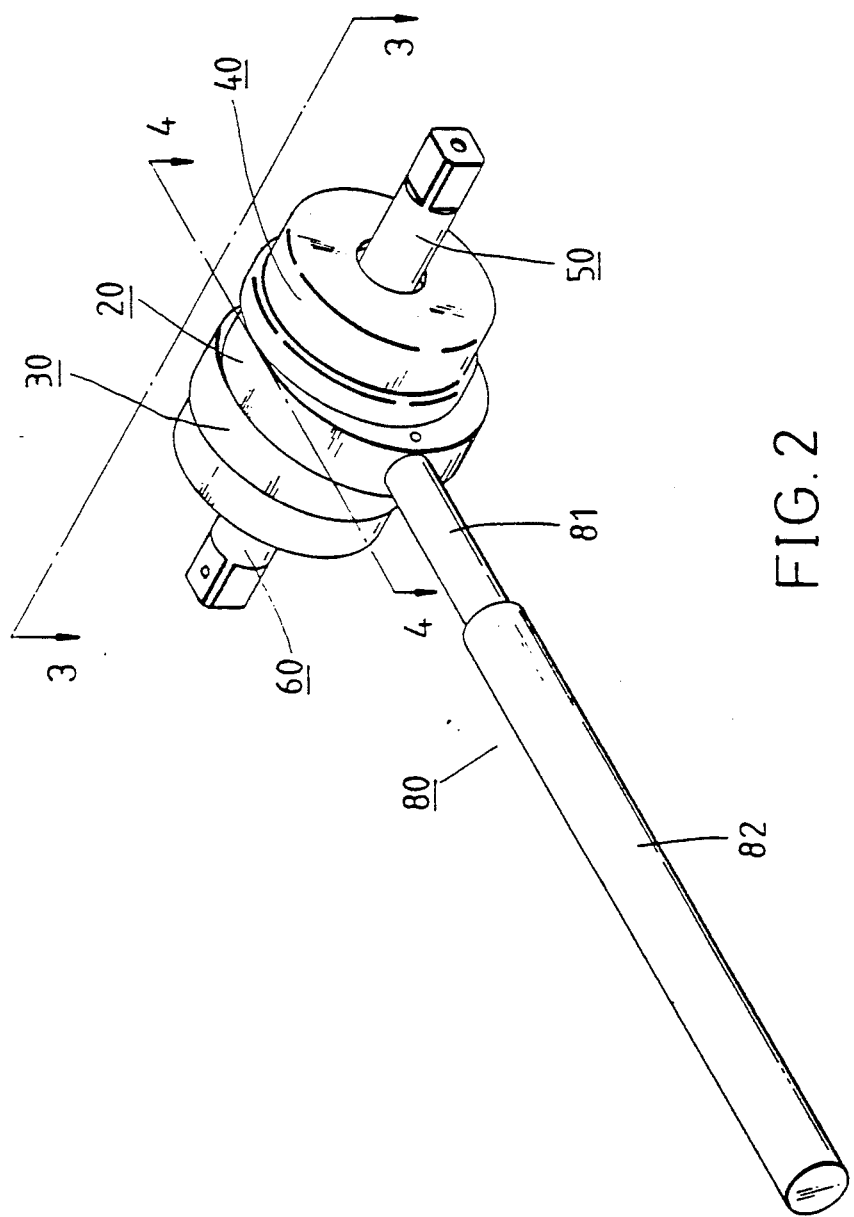
FIG. 2 is an assembled perspective of the hand tool in FIG. 1.
Figure 3:
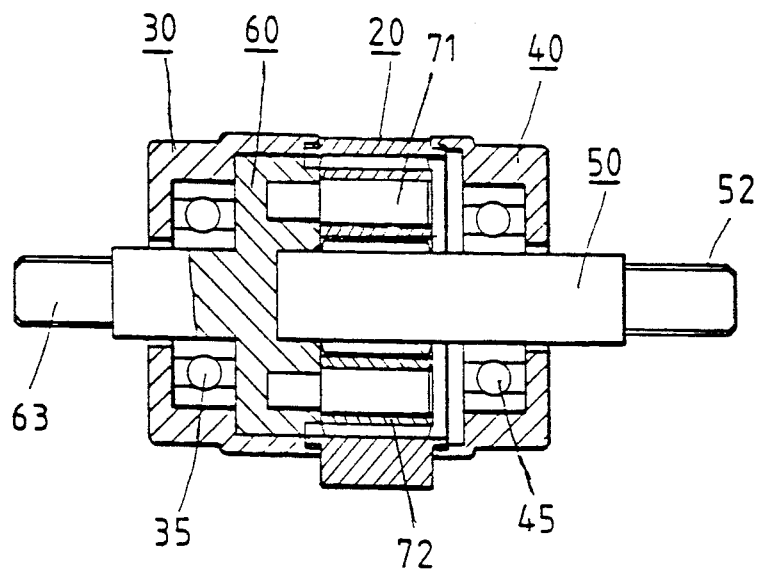
FIG. 3 is a sectional view taken along line 3—3 in FIG. 2.

Referring first to FIGS. 1-4, the hand tool of the present invention is shown comprising a main body 20, a first cover body 30, a first shaft bearing 35, a second cover body 40, a second shaftbearing 45, a first drive member 50, a second drive member 60, a transmission 70, and a positioning means 80.

The main body 20 comprises axially an eccentric through hole 21 having toothed portion 22 disposed along the inner wall surface thereof, an eccentric first male threaded portion 23 and an eccentric second male threaded portion 24 which are arranged respectively at front and rear ends thereof and are positioned correspondingly to the through hole 21, a blind hole 25 disposed radially in the outer wall surface thereof, and a pin hole 26 disposed axially and communicating with the blind hole 25.

The first cover body 30 comprises axially at the rear end thereof a first receiving room 31 which is larger than the second receiving room 32 adjacent to the first receiving room 31, and an axial hole 33 through the front end thereof. The inner wall surface of the first receiving room 31 comprises a first female threaded portion 34 intended to engage with the first male threaded portion 23 of the main body 20.

The first shaft bearing 35 with a centric axial hole 351 is received and positioned in the second receiving room 32 of the first cover body 30.

The second cover body 40 comprises axially at the front end thereof a third receiving room 41 which is larger than the fourth receiving room 42 adjacent to and communicating with the third receiving room 41, and an axial hole 43 penetrating through the rear end thereof. The inner wall surface of the third receiving room 41 is composed of a second female threaded portion 44 intended to engage with the second male threaded portion 24.

The second shaft bearing 45 with a centric axial hole 451 is received and positioned in the fourth receiving room 42 of the second cover body 40.

The first drive member 50 consists of a shaft 51, which in turn is composed of a first connection portion 52 located at the rear end thereof and of a toothed portion 53 and a swivel 54 located respectively at the front end thereof. The shaft 51 is received in the axial hole 451 of the second shaft bearing 45 while the first connection portion 52 is positioned in such a manner that it is exposed to the outside of the rear end of the second cover body 40.

The second drive member 60 is composed of a disk block 61 which in turn comprises a shaft 62 and a second connection portion 63 located respectively at the front end portion thereof. Located at the center of the rear end of the second drive member 60 is a swivel hole 64, which is to receive therein the swivel 54 of the first drive member 50 and is surrounded by three connection holes 65 arranged at equal intervals. The disk block 61 is received in the first receiving room 31 of the first cover body 30 while the shaft 62 is accommodated in the axial hole 351 of the first shaft bearing 35. The second connection portion 63 is positioned in such a way that it is exposed to the outside of the front end of the first cover body 30.

The transmission 70 is composed of three pivot rods 71 and three gears 72. Each of the three pivot rods 71 comprises an enlarged portion 711 and a connection portion 712 smaller in diameter in relation to the enlarged portion 711. The connection portion 712 is received in the connection hole 65 of the second drive member 60. Each of the gears 72 comprises centrally and axially a through hole 721 to receive therein the enlarged portion 711 of the pivot rod 71. As a result, all three gears 72 are capable of engaging respectively with the toothed portion 22 of the main body 20 and with the toothed portion 53 of the first drive member 50.

The positioning means 80 is composed of a set rod 81 and a support rod 82. The set rod 81 comprises radially a pin hole 811 to accommodate thereinto a pin 812 which also traverses the pin hole 26 of the main body 20 so as to fasten the set rod 81 securely to the main body 20. The support rod 82 comprises axially an insertion hole 821 of a predetermined depth to received therein the set rod 81.

Figure 4:
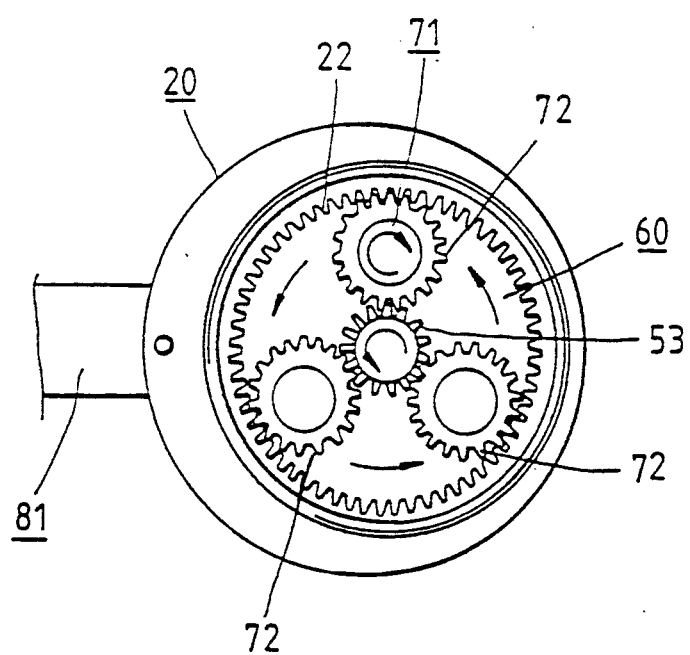
FIG. 4 is a sectional view taken along line 4—4 in FIG. 2.
Figure 5:
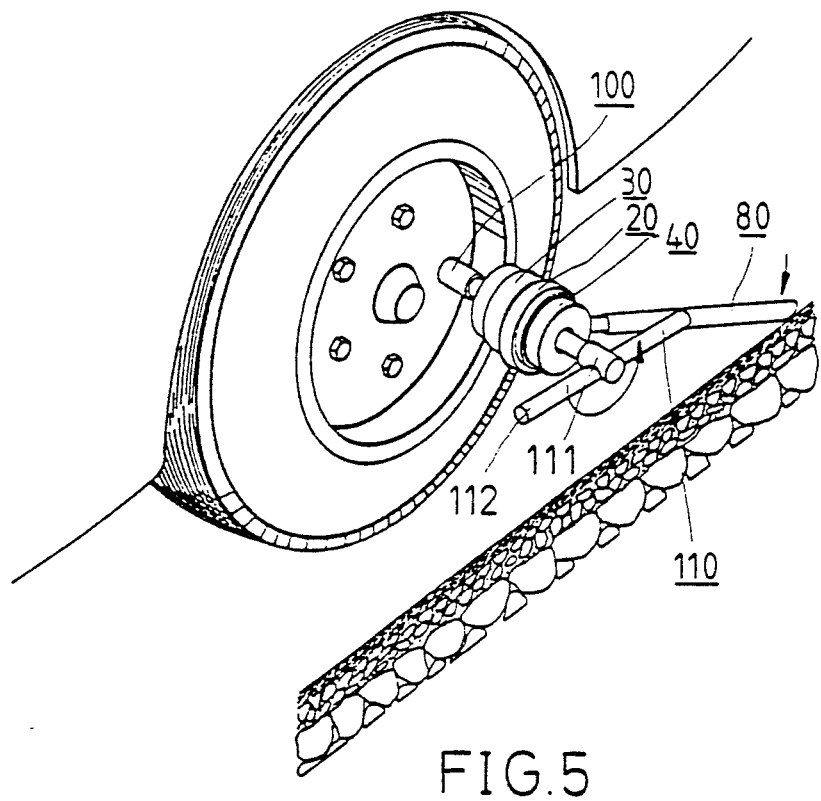
FIG. 5 is a schematic view showing the hand tool of the present invention being used to loosen the wheel nut.

Referring next to FIG. 5 showing the hand tool of the present invention being used to loosen the wheel nut, the second connection portion 63 of the second drive member 60 is shown being capped with a sleeve 100 of an appropriate size. In addition, the first connection portion 52 of the first drive member 50 is arranged thereto a handle 110. In the process of working to loosen the wheel nut, the sleeve 100 is first fitted over the wheel nut intended to be loosened. Thereafter, allow the bottom end of the support rod 82 to rest on the ground in order to hole up the wheel, and in the meantime permit the positioning means 80 to be in an inclined position in relation to the ground. The handle 110 can be now rotated counter-clock-wise to actuate the rotation of the first drive member 50, as shown in FIG. 4. It must be added here that the handle 110 comprises a main shaft 111 which in turn is composed of a radial hole to receive therethrough a branch arm 112 capable of sliding securely in the radial hole of the main shaft 111. As a result of the rotation of the first drive member 50, the three gears 72 begin to turn counter-clock-wise so as to initiate the rotation of the second drive member 60, which is then responsible for working to loosen the wheel nut with ease and speed.

After having loosened all the wheel nuts, the user of the hand tool of the present invention may remove the sleeve 100, which is then fitted over the first connection portion 52, and arrange the handle 110 on the second connection portion 63. In other words, the second drive member 60 has now become an input shaft while the first drive member 50 has become an output shaft. Accordingly, the loosened nuts can be removed from the wheel easily and rapidly.

Figure 6:
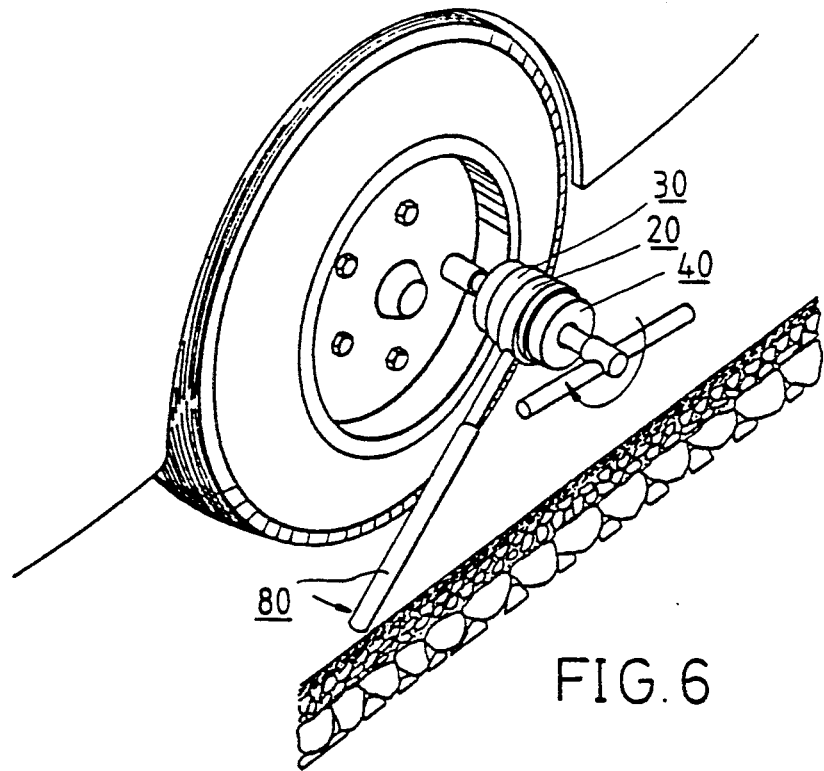
FIG. 6 is a schematic view showing to hand tool of the present invention being used to tighten to the wheel nut.

Now referring to FIG. 6 showing the hand tool of the present invention being used to tighten the wheel nut, the positioning means 80 is shown being arranged in an inclined position on the left hand side. The wheel nut can be thus tightened appropriately.

The hand tool of the present invention can sustain a greater torsion by virtue of the fact that the toothed portion 22 and the main body 20 are made into a body of unitary construction.

The positioning means 80 is made up of a set rod 81 and a support rod 82. When all the nuts have been loosened slightly, the hand tool of the present invention can be reversed to continue loosening the nuts. However, if the nuts intended to be loosened happen to be old, corroded, or damaged, the rapid action of removing the nuts may cause the phenomenon called "bitting", thereby resulting in a situation in which it is difficult to rotate and remove the nuts. Therefore, when a user has realized that the nuts intended to be removed are already rusted and corroded or damaged, the user may remove the support rod 82 from the positioning means 80 of the present invention so as to allow him or her to hold the handle 110 with one hand to make sure that the handle 110 is stabilized and to rotate the set rod 81 with the other hand in order to actuate the main body 20 and the second drive member 60. Thereafter, the user of the present invention may continue to rotate to remove the nuts with the speed at a ratio similar to one to one. This sort of design is capable of providing a remedy for a situation in which a high speed and a low torsion exist.

The inner end of the support rod 82 of the positioning means 80 of the present invention is inserted with an appropriate tightness into the outer end of the set rod 81. In addition, the insertion hole 821 of the support rod 82 is designed to have a considerable depth. As a result, the length of the entire positioning means 80 can be adjusted by insertion the set rod 81 into the insertion hole 821 of a depth. If the ground surface of the working place happens to be bumpy, the user of the present invention may try to find the most appropriate sustaining point by means of adjusting the length of the support rod 82.

The support rod 82 of the positioning means 80 can be detached from the hand tool, permitting the hand tool of the present invention to be stored in a small space inside the car trunk.

The hand tool of the present invention comprises a first cover body and a second cover body, with each of cover bodies having a shaft bearing disposed therein to so as to facilitate an easy and stable operation of the hand tool to loosen the wheel nut by a low speeding motion and a high torquing motion.

What is claimed is:

1. A wheel nut loosening and tightening hand tool comprising:

a main body consisting of an eccentric through hole having a unitary toothed portion disposed on the inner wall surface thereof, a first male threaded portion and a second male threaded portion disposed on the outer circumference thereof, a blind hole of a depth disposed at a predetermined position on the outer circumference thereof, and a pin hole arranged axially to communicate with said blind hole;

a first cover body comprising axially from the rear end thereof a first receiving room and a second receiving room adjacent to each other, and an axial hole traversing the front end surface thereof, said first receiving room having a first female threaded portion arranged on the inner wall surface thereof to engage with the first male threaded portion of said main body;

a first shaft bearing having centrally an axial hole and being received and positioned in the second receiving room of said first cover body;

a second cover body comprising axially from the front end thereof a third receiving room and a fourth receiving room adjacent to each other, and an axial hole traversing the rear end surface thereof, said third receiving room having a second female threaded portion arranged on the inner wall surface thereof to engage with the second male threaded portion of said main body;

a second shaft bearing having centrally an axial hole and being received and positioned in the fourth receiving room of said second cover body;

a first drive member comprising a shaft having a first connection portion located axially at the rear end thereof a toothed portion and a swivel located axially at the front end thereof, said shaft connecting pivotally with the axial hole of said second shaft bearing and said second cover body, said first connection portion extending to the outside of the rear end of said cover body, said toothed portion being positioned correspondingly to the toothed portion of said main body;

a second drive member comprising a disk block having a shaft and a second connection portion located axially at the front end thereof, said disk block being received in the first receiving room of said first cover body, said shaft being received pivotally in the axial holes of said first shaft bearing and said first cover body, said second connection portion extending to the outside of the front end of said first cover body, said disk block further comprising a swivel hole located centrally along the axis thereof and surrounded by three connection holes arranged at equal intervals;

a transmission comprising three pivot rods and three gears, with each of three pivot rods having an enlarged portion extending outwardly to form a connection portion, and with each of three gears having axially a through hole to receive therein the enlarged portion of said pivot rod, said three gears engaging respectively with toothed portions of said main body and said first drive member; and a positioning means comprising a set rod and a support rod, said set rod having radially a pin hole located at one end thereof in such a manner that it communicates with the pin hole of said main body to receive therein a pin rod, said support rod having axially an insertion hole of a depth located at one end thereof to receive therein said set rod.

* * * * *